United States Patent
Robinson et al.

(10) Patent No.: US 9,288,049 B1
(45) Date of Patent: Mar. 15, 2016

(54) CRYPTOGRAPHICALLY LINKING DATA AND AUTHENTICATION IDENTIFIERS WITHOUT EXPLICIT STORAGE OF LINKAGE

(71) Applicant: EMC Corporation, Hopkinton, MA (US)

(72) Inventors: Peter Robinson, Enoggera Reservoir (AU); David Alistair Healy, New Farm (AU); Nikolaos Triandopoulos, Arlington, MA (US)

(73) Assignee: EMC Corporation, Hopkinton, MA (US)

( * ) Notice: Subject to any disclaimer, the term of this patent is extended or adjusted under 35 U.S.C. 154(b) by 214 days.

(21) Appl. No.: 13/931,188

(22) Filed: Jun. 28, 2013

(51) Int. Cl.
*H04L 9/32* (2006.01)
*H04L 9/08* (2006.01)

(52) U.S. Cl.
CPC ............ *H04L 9/0866* (2013.01); *H04L 9/0861* (2013.01); *H04L 9/0869* (2013.01); *H04L 9/32* (2013.01); *H04L 9/3236* (2013.01)

(58) Field of Classification Search
CPC ............... H04L 9/0844; H04L 9/32; H04L 9/3236–9/3244; H04L 9/08; H04L 9/0861–9/0869; H04L 9/088; H04L 63/08; H04L 9/3218; H04L 9/3223; H04L 9/3226; H04L 9/3228; H04L 9/3242; G06F 21/6245; G06F 21/6254
See application file for complete search history.

(56) References Cited

U.S. PATENT DOCUMENTS

| | | | |
|---|---|---|---|
| 2002/0087860 A1* | 7/2002 | William Kravitz | 713/168 |
| 2006/0177056 A1* | 8/2006 | Rostin | H04L 9/0869 380/46 |
| 2007/0124321 A1* | 5/2007 | Szydlo | 707/102 |
| 2010/0208888 A1* | 8/2010 | Weber | 380/44 |
| 2013/0117824 A1* | 5/2013 | Naslund | H04L 9/0841 726/4 |
| 2014/0006786 A1* | 1/2014 | Campagna | H04L 9/0869 713/171 |
| 2014/0331060 A1* | 11/2014 | Hayton | 713/186 |

* cited by examiner

*Primary Examiner* — Ashok Patel
*Assistant Examiner* — Daniel Potratz
(74) *Attorney, Agent, or Firm* — Ryan, Mason & Lewis, LLP

(57) ABSTRACT

Methods and apparatus are provided for cryptographically linking data identifiers and authentication identifiers without storing the association between the authentication and data secrets in the database of the server. A data secret of a client is provided to a server for storage with an authentication identifier (AuthId) and a pseudo-random client value. The server provides the client with a sequence number of the stored data secret that is associated with a data identifier (DataId) identifying the data secret obtained using a Key Derivation Function and a storage seed. The client registers with the server to obtain the authentication identifier (AuthId). Techniques are also provided for retrieving and updating the data secret.

20 Claims, 3 Drawing Sheets

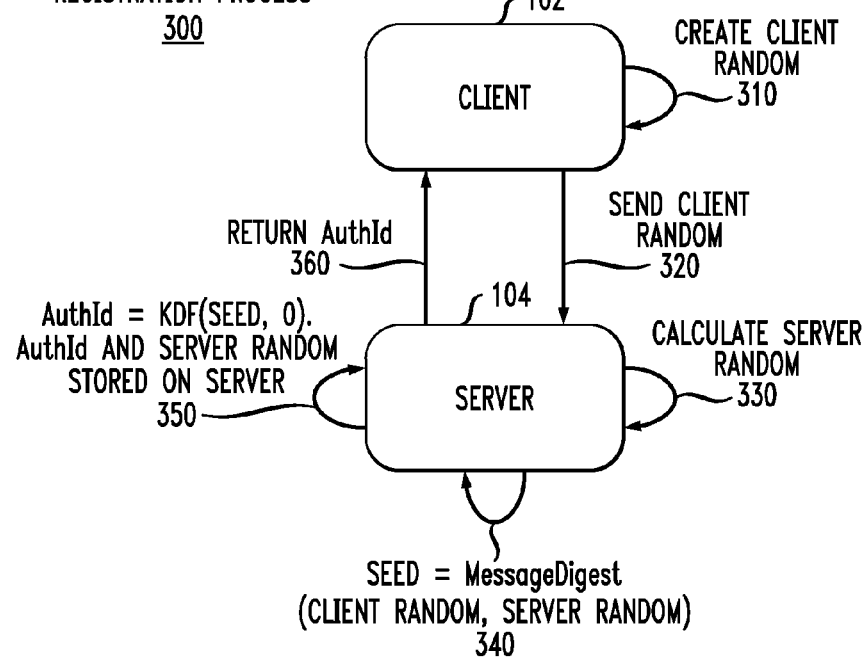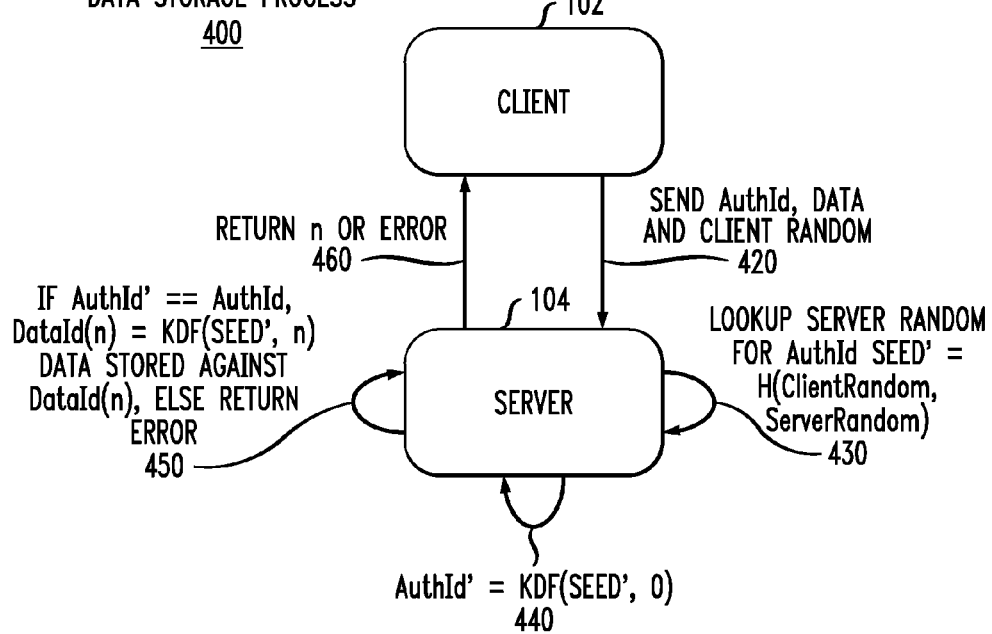

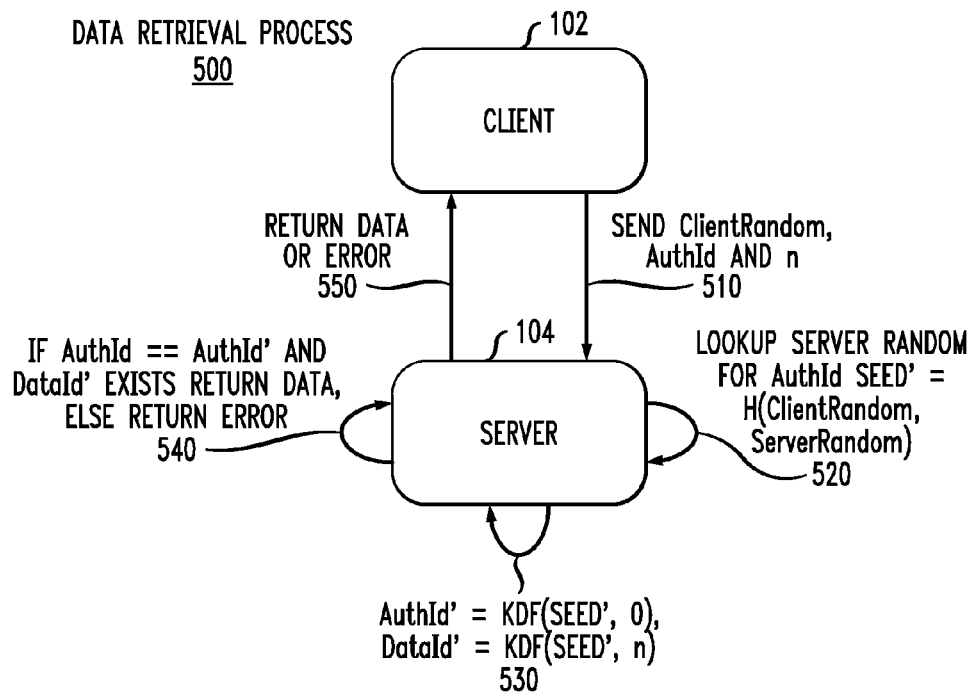
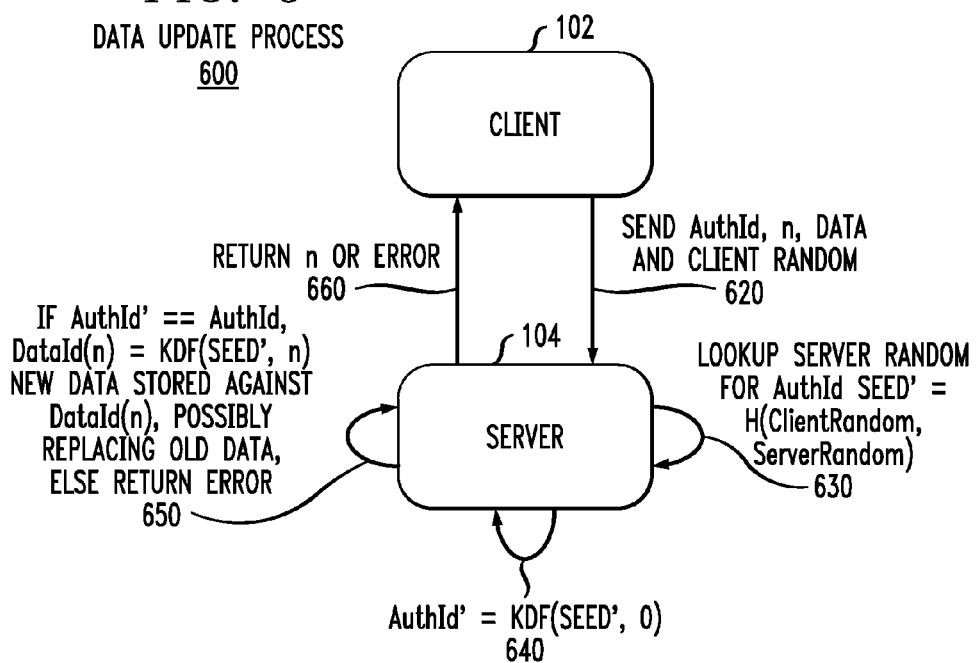

CRYPTOGRAPHICALLY LINKING DATA AND AUTHENTICATION IDENTIFIERS WITHOUT EXPLICIT STORAGE OF LINKAGE

FIELD

The present invention relates generally to techniques for linking data secrets with a corresponding authentication secret.

BACKGROUND

One or more data secrets should be "owned" by an authentication secret. In other words, a user must authenticate with a given authentication secret to gain access to a certain data secret. No other authentication secret should be able to be used to gain access to the associated data secret. In order to link data secrets with a corresponding authentication secret (e.g., defining which data secret is owned by (or associated with) which authentication secret), a look-up table is typically employed in which each data identifier (DataId) for a given data secret is matched up with the authentication identifier (AuthId) of the corresponding authentication secret that owns the data secret. The look-up table association, however, is explicitly stored in the server's database.

From a security perspective, explicitly storing the association between data secrets and corresponding authentication secrets means that an attacker who steals the database will obtain the association between data secrets and corresponding authentication secrets. If, for instance, the attacker knows that a certain authentication secret belongs to a user of interest, then the attacker may wish to concentrate their efforts on obtaining (and recovering) the data secrets associated with the authentication secret for the user of interest (the data secrets may be individually protected at the server).

In addition, explicitly storing the association between data secrets and corresponding authentication secrets (e.g., having a link between a value in one table and a value in another table) causes scalability issues.

A need therefore exists for methods and apparatus for linking secrets by identifiers without explicit storage of the linking values in the server (i.e., without storing the association between authentication and data secrets in the database of the server). A further need exists for methods and apparatus for mathematically determining the identifiers.

SUMMARY OF THE INVENTION

Generally, methods and apparatus are provided for cryptographically linking data identifiers and authentication identifiers without storing the association between the authentication and data secrets in the database of the server. According to one aspect of the invention, a data secret of a client is stored by a server by receiving an authentication identifier (AuthId) identifying an authentication secret, the data secret and a pseudo-random client value from the client; determining a pseudo-random server value associated with the received authentication identifier (AuthId); calculating a storage seed value for a Key Derivation Function based on the pseudo-random client value and the pseudo-random server value; obtaining a storage authentication identifier (AuthId) identifying the authentication secret using the Key Derivation Function and the storage seed; obtaining a data identifier (DataId) identifying the data secret using the Key Derivation Function and the storage seed, if the storage authentication identifier (AuthId) is substantially equal to the received authentication identifier (AuthId), wherein the data identifier (DataId) comprises a sequence number of an instance of the data secret; and returning the sequence number of the data secret instance to the client.

According to a further aspect of the invention, the client registers with the server by obtaining the pseudo-random client value from the client; and generating the pseudo-random server value for storage on the server. The pseudo-random client value and the pseudo-random server value can be combined to produce a registration seed for a Key Derivation Function. The authentication identifier (AuthId) identifying the authentication secret can be generated using the Key Derivation Function and the registration seed and then provided to the client.

According to another aspect of the invention, the client retrieves the data secret by obtaining the authentication identifier (AuthId) identifying the authentication secret, the pseudo-random client value and the data identifier (DataId) identifying the data secret; determining a pseudo-random server value for the received authentication identifier (AuthId) identifying the authentication secret; obtaining a retrieval seed for a Key Derivation Function based on the pseudo-random client value and the pseudo-random server value; obtaining a retrieval authentication identifier (AuthId) identifying the authentication secret and a retrieval data identifier (DataId) identifying the data secret using the Key Derivation Function and the retrieval seed; and returning the data secret if the retrieval authentication identifier (AuthId) is substantially equal to the received authentication identifier (AuthId) and the retrieval data identifier (DataId) identifying the data secret exists. An update to the data secret can also be stored by the server. The client provides the updated data secret with the corresponding data identifier (DataId).

The disclosed techniques for cryptographically linking data secrets with a corresponding authentication secret of the illustrative embodiments overcome one or more of the problems associated with the conventional techniques described previously and provide improved security by linking data secrets with a corresponding authentication secret without explicitly storing the linkage (i.e., without storing the association between authentication and data secrets in the database of the server). These and other features and advantages of the present invention will become more readily apparent from the accompanying drawings and the following detailed description.

BRIEF DESCRIPTION OF THE DRAWINGS

FIG. 3 is a flow diagram showing an exemplary registration process that incorporates aspects of the present invention;

FIG. 4 is a flow diagram showing an exemplary data storage process that incorporates aspects of the present invention;

FIG. 5 is a flow diagram showing an exemplary data retrieval process that incorporates aspects of the present invention; and FIG. 6 is a flow diagram showing an exemplary data update process that incorporates aspects of the present invention.

DETAILED DESCRIPTION

The present invention will be described herein with reference to an example network-based communication system in which one or more clients communicate over a network with one or more servers. It is to be appreciated, however, that the invention is not restricted to use in this or any other particular system configuration.

Aspects of the present invention provide improved techniques for cryptographically linking data secrets with a corresponding authentication secret. In one exemplary embodiment, an authentication identifier (AuthId) is cryptographically associated with its associated data identifiers (DataIds) using a client value (Client Random) that is stored outside the server and with a server value (Server Random) that is stored inside the server. To improve the security of the system the Server Random can optionally be encrypted using an encryption key that is stored in a Hardware Security Module (HSM). The client and server values are combined to produce a seed for a Key Derivation Function, which in turn is used to generate and validate the AuthId and DataIds.

Exemplary System

Figure 1:
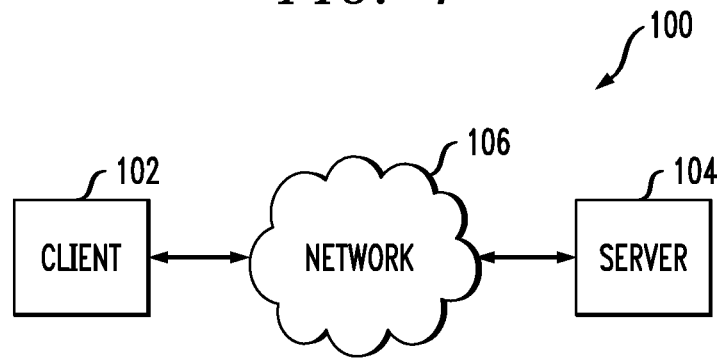
FIG. 1 is a simplified block diagram of an exemplary network environment in which the cryptographic techniques of the present invention may be implemented.

FIG. 1 shows a simplified network-based communication system 100 that will be used to illustrate the secure authentication techniques of the invention. The exemplary system 100 includes a client 102 and a server 104, both of which are configured to communicate over a network 106. As discussed hereinafter, the server 104 provides secure data storage and retrieval in accordance with aspects of the invention.

Although only a single client 102 is shown in FIG. 1, it is expected that a practical implementation of the system 100 will support a substantially larger number of clients. Similarly, although only a single server 104 is shown in FIG. 1, a system in accordance with the invention may include many such servers. The invention is therefore not restricted to the particular number of client or server devices.

The client 102 may represent a lightweight device, such as a mobile telephone, PDA, game console, etc. The client 102 may alternatively represent a desktop or laptop personal computer (PC), a microcomputer, a workstation, a mainframe computer, a wired telephone, a facsimile machine, a television set top box, or any other information processing device which can benefit from the secure authentication techniques of the invention. The client 102 may therefore also be implemented as a server. In other words, the invention, although particularly well-suited for use in applications in which roaming lightweight client devices authenticate themselves to servers, can be used for the secure authentication of any type of information processing device, including a device that is itself a server.

The client 102 may also be referred to herein as a user. The term "user" should be understood to encompass either a client device, a person utilizing or otherwise associated with the device, or both. An operation described herein as being performed by a user may therefore be performed by a device, a person utilizing or otherwise associated with the device, or by both the user and the device. Similarly, a password associated with a device may be a password of a user of the device. In this case, the password may be temporarily associated with the device upon entry of the password into the device by the user, as in the case of a device that serves multiple users each having different passwords.

The server 104 may be implemented as an otherwise conventional server programmed to perform the secure storage and retrieval functions described herein or as other types of suitably-programmed information processing devices.

The network 106 may represent a global computer network such as the Internet, a wide area network (WAN), a local area network (LAN), a satellite network, a telephone or cable network, or various portions or combinations of these and other types of networks.

As is apparent from the foregoing, the system 100 as illustrated in FIG. 1 may be viewed more generally as a system having at least two processing devices that are configured to communicate with one another and in which a given one of the devices securely stores data of the other devices. The particular "client" and "server" labels provided for devices in FIG. 1 should thus be considered as examples only and not limitations of the invention.

Figure 2:
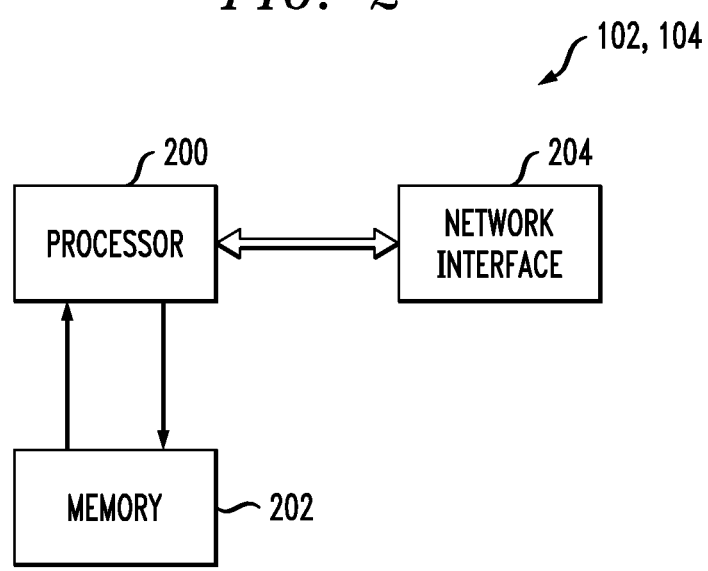
FIG. 2 illustrates one possible implementation of a given one of the client or server devices of the FIG. 1 system.

FIG. 2 shows one possible implementation of a given one of the processing devices 102 or 104 of the FIG. 1 system. The device in this implementation includes a processor 200 coupled to a memory 202 and a network interface 204. These device elements may be implemented in whole or in part as a conventional microprocessor, digital signal processor, application-specific integrated circuit (ASIC) or other type of circuitry, as well as portions or combinations of such circuitry elements. As will be appreciated by those skilled in the art, a secure authentication protocol in accordance with the present invention can be implemented at least in part in the form of one or more software programs that are stored in device memory 202 and executed by the corresponding processor 200. The memory 202 is also used for storing information used to perform computations or other operations associated with the secure authentication protocols of the invention.

FIG. 3 is a flow diagram showing an exemplary registration process 300 that incorporates aspects of the present invention. Generally, the registration process 300 generates an authentication identifier (AuthId) and a Server Random value, both of which are stored on the server 104. The AuthId value is returned to the client.

As shown in FIG. 3, the client 102 generates a random number, referred to as "ClientRandom," during step 310. The client 102 then submits the ClientRandom to the server 104 during step 320. The server 104 generates a random number, referred to as "ServerRandom" during step 330.

The server 104 calculates a seed value during step 340 as follows:

Seed=MessageDigest(ClientRandom, ServerRandom)

Finally, the server 104 calculates the authentication identifier during step 350 as follows, and the AuthID and ServerRandom values are stored on the server:

AuthId=KeyDerivationFunction(Seed, 0).

To ensure the security of the system, the Server Random is optionally encrypted using an encryption key that is stored separately in a hardware security module (HSM) or a similar device. In this embodiment, only the encrypted value of the Server Random should be stored.

FIG. 4 is a flow diagram showing an exemplary data storage process 400 that incorporates aspects of the present invention. Generally, the data storage process 400 takes the authentication identifier (AuthId), Data and ClientRandom and stores the Data against DataId on the server 104. In accordance with aspects of the present invention, the mapping between AuthId and DataId is never stored. In addition, DataId is not returned to the client 102 as can be derived from AuthId, ClientRandom and n.

As shown in FIG. 4, the client 102 submits the ClientRandom value generated during step 310, together with the AuthID and Data, to the server 104 during step 420.

The server 104 looks up and decrypts, if necessary, the ServerRandom for the received AuthID and calculates the seed value during step 430, as follows:

Seed'=H(ClientRandom, ServerRandom).

It is noted that the H function and Message Digest function are both cryptographically secure hash functions, as would be apparent to a person of ordinary skill in the art.

The server 104 calculates the AuthId during step 440, as follows:

AuthId'=KeyDerivationFunction(Seed', 0).

If AuthId'==AuthId, then the server 104 calculates the DataId(n) during step 450, as follows:

DataId(n)=KeyDerivationFunction(Seed', n), where n is the offset number of the data secret. The provided Data is then stored against the generated DataId(n).

If it is determined during step 450, however, that AuthId' does not equal AuthId; then the server 104 returns an error.

The server returns n or an Error during step 460.

FIG. 5 is a flow diagram showing an exemplary data retrieval process 500 that incorporates aspects of the present invention. Generally, the data retrieval process 500 takes AuthId, ClientRandom and n. The data retrieval process 500 looks up and decrypts, if necessary, the ServerRandom value based on AuthId, generates AuthId' and DataId' and then checks that both exist, if so, the data is returned, otherwise an error is returned.

As shown in FIG. 5, the client 102 submits the ClientRandom value, together with the AuthID and n to the server 104 during step 510. The server 104 looks up and decrypts, if necessary, the ServerRandom value for the received AuthID and calculates the seed value during step 520, as follows:

Seed'=H(ClientRandom, ServerRandom).

The server 104 calculates AuthId' and DataId' during step 530, as follows:

AuthId'=KeyDerivationFunction(Seed', 0); and

DataId'=KeyDerivationFunction(Seed', n).

If AuthId'==AuthId and DataId' exists during step 540; then the server 104 returns the data; otherwise the server 104 returns an error.

Thus, the server 104 returns the data or an error during step 550.

FIG. 6 is a flow diagram showing an exemplary data update process 600 that incorporates aspects of the present invention. Generally, the data update process 600 takes the authentication identifier (AuthId), new Data value, n (the offset value of the Data to be updated) and ClientRandom and stores the Data against the Data ID on the server 104 (FIG. 1). In accordance with aspects of the present invention, the mapping between AuthId and DataId is never stored. In addition, DataId is not provided by the client 102 (FIG. 1), rather the offset value "n" is provided as the DataId can be derived from AuthId, ClientRandom and n.

As shown in FIG. 6, the client 102 submits the ClientRandom value generated during step 310, together with the AuthID, n and Data, to the server 104 during step 620.

The server 104 then looks up and decrypts, if necessary, the ServerRandom value for the received AuthID and calculates the seed value during step 630, as follows:

Seed'=H(ClientRandom, ServerRandom).

The server 104 calculates the AuthId during step 640, as follows:

AuthId'=KeyDerivationFunction(Seed', 0).

If AuthId'==AuthId, then the server 104 calculates the DataId(n) during step 650, as follows:

DataId(n)=KeyDerivationFunction(Seed', n), where n is the offset number of the data secret as provided by the client 102. The new data is stored against DataId(n), possibly replacing the old data.

If it is determined during step 650, however, that AuthId' does not equal AuthId; then the server 104 returns an error.

The server returns n or an Error during step 660.

Extension to Split Data Secrets

The present invention may be applied, for example, to multi-server authentication. Generally, two or more servers, such as a Red Server and a Blue Server, determine if they hold the equivalent authentication values ($Q_{blue}$ and $Q_{red}$).

For a more detailed discussion of, see, for example, U.S. Pat. No. 7,725,730, entitled "Cryptographic Methods and Apparatus for Secure Authentication," or U.S. patent application Ser. No. 13/404,737, filed Feb. 24, 2012, entitled "Method and Apparatus for Authenticating a User Using Multi-Server One-Time Passcode Verification," (now U.S. Pat. No. 9,118,661), each incorporated by reference herein.

The distributed secret system associated with multi-server authentication can be extended to store data split secrets as well as authentication split secrets. For the two server variant, a data secret is XORed with a pseudo random number, and the pseudo random number is stored on one server, and the data secret is XORed with the pseudo random number is stored on the other server. To retrieve the data secret, the client 102 authenticates with the server(s) 104 and requests the data secret.

In this manner, data secrets are cryptographically linked with a corresponding authentication secret. Among other benefits, the disclosed cryptographic linking techniques do not require the storage of the association between the authentication and data secrets in the database of the server. Thus, the disclosed cryptographic linking techniques do not have the above-described security problem associated with conventional linkage techniques that explicitly store the association between AuthIds and DataIds, where an attacker who steals the database will know the association between AuthIds and DataIds. If, for instance, the attacker knows that a certain AuthId belongs to a user of interest to them, then the attacker may concentrate their cracking efforts on the DataIds associated with the AuthId. In addition, the disclosed cryptographic linking techniques do not have an association between two values in the database of the server, thereby improving scalability as it means two separate tables do not have to be updated simultaneously.

As mentioned previously herein, the above-described embodiments of the invention are presented by way of illustrative example only. Numerous variations and other alternative embodiments may be used. For example, while the present invention has been illustrated using a Key Derivation Function to compute the authentication and data identities AuthId, and DataId, the present invention could be employed using a Hash-Based Message Authentication Code (HMAC), which is a form of a Key Derivation Function. In a further variation, the calculation of the seed could be implemented using a key agreement. In other words, the client 102 supplies a pseudo-random client random value (CR) equal to g^ClientRandom mod p and the server 104 calculates Seed equal to g^(ServerRandomxCR) mod p. In this manner, the ClientRandom value is not sent in the clear.

In addition to AuthId, and DataId, which are linked by aspects of the present invention, there could be other classes of identifiers. For example, AuthId=KeyDerivationFunction(seed, 0)

DataId1=KeyDerivationFunction(seed, 1)

. . .

DataId100=KeyDerivationFunction(seed, 100)

LifeQuestionAnswer_id1=KeyDerivationFunction(seed, 101)

...

LifeQuestionAnswer_id200=KeyDerivationFunction (seed, 200)

Additional details regarding certain conventional cryptographic techniques referred to herein may be found in, e.g., A. J. Menezes et al., Handbook of Applied Cryptography, CRC Press, 1997, which is incorporated by reference herein.

The term "authentication information" as used herein is intended to include passwords, passcodes, answers to life questions, or other authentication credentials, or values derived from such authentication credentials, or more generally any other information that a user may be required to submit in order to obtain access to an access-controlled application. Although the illustrative embodiments are described herein in the context of passwords, it is to be appreciated that the invention is more broadly applicable to any other type of authentication information.

The illustrative embodiments of the invention as described herein provide improved techniques for cryptographically linking data secrets with a corresponding authentication secret. The described techniques may be used with security tokens that generate one-time passwords or other types of authentication information, regardless of whether such tokens are connectable to the user device.

It should again be emphasized that the particular authentication techniques described above are provided by way of illustration, and should not be construed as limiting the present invention to any specific embodiment or group of embodiments. For example, as previously noted, the described embodiments may be adapted in a straightforward manner to operate with time-varying credentials, such as token codes, or authentication information, and other types of access-controlled resources. Also, the particular configuration of system elements shown in FIGS. 1 and 2, and their interactions as shown in FIGS. 3 through 6, may be varied in other embodiments. Moreover, the various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

What is claimed is:

1. A method performed by a server for storing a data secret of a client, the method comprising the steps of:
   receiving an authentication identifier identifying an authentication secret, said data secret, and a pseudo-random client value from said client;
   determining a pseudo-random server value associated with said received authentication identifier;
   calculating, using at least one processing device, a storage seed based on a first cryptographic hash function using said pseudo-random client value and said pseudo-random server value as input;
   obtaining, using at least one processing device, a storage authentication identifier identifying said authentication secret using said storage seed;
   obtaining, using at least one processing device, a storage data identifier identifying said data secret using a second cryptographic hash function using said storage seed and a sequence number as input, if said storage authentication identifier is substantially equal to said received authentication identifier, wherein said sequence number is associated with said data secret and wherein said storage data identifier is not accessible by said client;
   storing, using at least one processing device, said data secret in a memory location of a memory of said server based on said storage data identifier if said storage authentication identifier is substantially equal to said received authentication identifier; and
   returning said sequence number associated with said stored data secret to said client.

2. The method of claim 1, further comprising the step of returning an error message if said storage authentication identifier is not substantially equal to said received authentication identifier.

3. The method of claim 1, wherein said storage data identifier comprises an identifier to an answer of a life question.

4. The method of claim 1, further comprising the steps of:
   obtaining said pseudo-random client value from said client; and
   generating said pseudo-random server value for storage on said server.

5. The method of claim 4, further comprising the steps of:
   combining said pseudo-random client value and said pseudo-random server value to produce a registration seed for a third cryptographic hash function;
   generating said authentication identifier identifying said authentication secret using said third cryptographic hash function and said registration seed; and
   providing said authentication identifier to said client.

6. The method of claim 1, further comprising the steps of:
   obtaining said authentication identifier identifying said authentication secret, said pseudo-random client value, and said sequence number;
   determining said pseudo-random server value associated with said received authentication identifier identifying said authentication secret;
   obtaining a retrieval seed based on said first cryptographic hash function, said pseudo-random client value, and said pseudo-random server value;
   obtaining a retrieval authentication identifier identifying said authentication secret based on said retrieval seed and obtaining a retrieval data identifier identifying a memory location of said memory where said data secret is stored, using said second cryptographic hash function, said sequence number, and said retrieval seed; and
   returning said data secret if (i) said retrieval authentication identifier is substantially equal to said received authentication identifier and (ii) said retrieval data identifier exists.

7. The method of claim 1, further comprising the steps of receiving an update to said data secret, said sequence number, and an authentication identifier identifying an authentication secret; obtaining an update authentication identifier identifying said authentication secret using said storage seed; and storing said received update if said update authentication identifier is substantially equal to said received authentication identifier.

8. The method of claim 1, further comprising the step of encrypting the pseudo-random server value using an encryption key stored in a Hardware Security Module (HSM).

9. A computer program product comprising a non-transitory machine-readable recordable storage medium having encoded therein executable code of one or more software programs, wherein the one or more software programs when executed by a processor of a server store a data secret of a client by implementing the following steps of:
   receiving an authentication identifier identifying an authentication secret, said data secret, and a pseudo-random client value from said client;
   determining a pseudo-random server value associated with said received authentication identifier;

calculating, using at least one processing device, a storage seed based on a first cryptographic hash function using said pseudo-random client value and said pseudo-random server value as input;

obtaining, using at least one processing device, a storage authentication identifier identifying said authentication secret using said storage seed;

obtaining, using at least one processing device, a storage data identifier identifying said data secret using a second cryptographic hash function using said storage seed and a sequence number as input, if said storage authentication identifier is substantially equal to said received authentication identifier, wherein said sequence number is associated with said data secret and wherein said storage data identifier is not accessible by said client;

storing, using at least one processing device, said data secret in a memory location of a memory of said server based on said storage data identifier if said storage authentication identifier is substantially equal to said received authentication identifier; and returning said sequence number associated with said stored data secret to said client.

10. A server apparatus for storing a data secret of a client, the apparatus comprising:

a memory; and at least one processing device comprising at least one processor, coupled to the memory, configured to:

receive an authentication identifier identifying an authentication secret, said data secret, and a pseudo-random client value from said client;

determine a pseudo-random server value associated with said received authentication identifier;

calculate, using at least one processing device, a storage seed based on a first cryptographic hash function using said pseudo-random client value and said pseudo-random server value as input;

obtain, using at least one processing device, a storage authentication identifier identifying said authentication secret using said storage seed;

obtain, using at least one processing device, a storage data identifier identifying said data secret using a second cryptographic hash function using said storage seed and a sequence number as input, if said storage authentication identifier is substantially equal to said received authentication identifier, wherein said sequence number is associated with said data secret and wherein said storage data identifier is not accessible by said client;

store, using at least one processing device, said data secret in a memory location of a memory of said server based on said storage data identifier if said storage authentication identifier is substantially equal to said received authentication identifier; and return said sequence number associated with said stored data secret to said client.

11. The apparatus of claim 10, wherein said at least one processing device is further configured to return an error message if said storage authentication identifier is not substantially equal to said received authentication identifier.

12. The apparatus of claim 10, wherein said storage data identifier comprises an identifier to an answer of a life question.

13. The apparatus of claim 10, wherein said at least one processing device is further configured to:

obtain said pseudo-random client value from said client; and generate said pseudo-random server value for storage on said server.

14. The apparatus of claim 13, wherein said at least one processing device is further configured to:

combine said pseudo-random client value and said pseudo-random server value to produce a registration seed for a third cryptographic hash function;

generate said authentication identifier identifying said authentication secret using said third cryptographic hash function and said registration seed; and provide said authentication identifier to said client.

15. The apparatus of claim 10, wherein said at least one processing device is further configured to:

obtain said authentication identifier identifying said authentication secret, said pseudo-random client value, and said sequence number;

determine said pseudo-random server value associated with said received authentication identifier identifying said authentication secret;

obtain a retrieval seed based on said first cryptographic hash function, said pseudo-random client value, and said pseudo-random server value;

obtain a retrieval authentication identifier identifying said authentication secret based on said retrieval seed and obtaining a retrieval data identifier identifying a memory location of said memory where said data secret is stored, using said second cryptographic hash function, said sequence number, and said retrieval seed; and return said data secret if (i) said retrieval authentication identifier is substantially equal to said received authentication identifier and (ii) said retrieval data identifier exists.

16. The apparatus of claim 10, wherein said at least one processing device is further configured to receive an update to said data secret, said sequence number, and an authentication identifier identifying an authentication secret; obtain an update authentication identifier identifying said authentication secret using said storage seed; and store said received update if said update authentication identifier is substantially equal to said received authentication identifier.

17. The apparatus of claim 10, wherein said at least one processing device is further configured to encrypt the pseudo-random server value using an encryption key stored in a Hardware Security Module (HSM).

18. The computer program product of claim 9, further comprising the step of returning an error message if said storage authentication identifier is not substantially equal to said received authentication identifier.

19. The computer program product of claim 9, further comprising the steps of:

obtaining said pseudo-random client value from said client;

generating said pseudo-random server value for storage on said server;

combining said pseudo-random client value and said pseudo-random sever value to produce a registration seed for a third cryptographic hash function;

generating said authentication identifier identifying said authentication secret using said third cryptographic hash function and said registration seed; and providing said authentication identifier to said client.

20. The computer program product of claim 9, further comprising the steps of receiving an update to said data secret, said sequence number, and an authentication identifier identifying an authentication secret; obtaining an update authentication identifier identifying said authentication secret using said storage seed; and storing said received update if said update authentication identifier is substantially equal to said received authentication identifier.

* * * * *